United States Patent [19]

Elliott

[11] 4,259,937
[45] Apr. 7, 1981

[54] FUEL TREATMENT DEVICE

[75] Inventor: Kevin J. Elliott, Pointe Claire, Canada

[73] Assignee: Tempetro International Limited, Montreal, Canada

[21] Appl. No.: 3,595

[22] Filed: Jan. 15, 1979

[51] Int. Cl.³ ............................................. F02M 31/00
[52] U.S. Cl. ..................................... 123/557; 165/154; 123/549
[58] Field of Search ............... 123/122 E, 133, 122 H, 123/122 F, 557, 558, 549; 165/51, 154

[56] References Cited

U.S. PATENT DOCUMENTS

| | | | |
|---|---|---|---|
| 3,201,934 | 8/1965 | Smith | 123/122 E |
| 3,334,400 | 8/1967 | Jaeger | 165/154 |
| 3,472,214 | 10/1969 | Moon | 123/122 E |
| 3,498,279 | 3/1970 | Seeley | 123/122 P |
| 3,929,187 | 12/1975 | Hurner | 123/122 E |
| 3,986,486 | 10/1976 | Rabbiosi | 123/122 E |

Primary Examiner—Ronald H. Lazarus
Attorney, Agent, or Firm—McFadden, Fincham & Co.

[57] ABSTRACT

A fuel temperature controlling device for heating fuel metered to the internal combustion engine. The device has an elongated chamber having a fuel flow controlling passage therethrough with opposed ends thereof forming a fuel inlet and fuel outlet. A heat conductive central core generally is provided in the chamber, a thermal heating element mounted in the core, and a plurality of radially extending fuel passages axially located in the chamber, the passages being separated by spaced-apart fins radially extending outwardly from said core and in contact with said core so that fuel passing through said passages from said inlet to said outlet may be subjected to a temperature increase in response to temperature sensing means monitoring the temperature of said fuel during passage through said device.

5 Claims, 8 Drawing Figures

FUEL TREATMENT DEVICE

This invention relates to an apparatus for conditioning liquid fuel.

More particularly, this invention relates to a device for controlling the temperature of fuel being delivered to a metering apparatus, such as a carburetor, for an internal combustion engine in order to achieve greater efficiency and economy in the operation of the internal combustion engine relative to the fuel delivery thereto.

The prior art contains numerous examples of references to preheaters for liquid fuel such as gasoline, for internal combustion engines. Such references relate to various attempts to design devices which would achieve a beneficial result in the economy of internal combustion engines.

Reference may be had to numerous patents including, for example, U.S. Pat. No. 2,748,758, June 5, 1956, illustrating a combination heating and condensing fuel tank which is provided with a hot water jacket around the lower portion of the tank. Another example is illustrated in U.S. Pat. No. 3,110,296, of Nov. 12, 1963, which discloses the use of a coil-type heat exchanger designed to preheat a portion of the fuel being delivered to a carburetor. U.S. Pat. No. 3,253,647 of May 31, 1966 illustrates a similar coil-type preheater, while U.S. Pat. No. 3,286,703 issued Nov. 22, 1966 shows the substitution of a float bowl on a conventional carburetor with an expanded water-jacketed bowl with two or three times the volume of the original device, and which water jacket is connected to the water pump of an internal combustion engine to circulate hot water through the jacket.

In general, the prior art devices have paid little attention to the fact that the fuel temperature must be maintained over a given range in order to achieve the greatest effectiveness for fuel economy in the operation of the internal combustion engine. Thus, very little attention was provided to the regulation of the heating on the fuel and to achieve proper regulation, temperature conditions for heating the fuel cannot be such that they create a vapor lock in a fuel line by heating the fuel to too great an extent or alternately, by not heating the fuel sufficiently to achieve the desired results.

As is known by those skilled in the art, gasoline, a mixture of hydrocarbon fractions having various boiling points, and which will vary depending on the season and the location of usage, will have different boiling temperatures and thus, usage of a device which does not properly control the temperatures, or provide a sufficient temperature input for the heating of the fuel, is not accurate and thus will not provide the full advantages.

With this invention, applicant has developed a device capable of controlling the heating of liquid fuels for use in an internal combustion engine, and which device is a relatively simple and yet highly effective device, for achieving the greatest efficiency for the fuels.

In brief summary, and according to this invention, there is provided a fuel temperature controlling device for an internal combustion engine in which fuel is metered to the internal combustion engine, the device comprising a generally cylindrical chamber having a fuel flow controlling passage therethrough with opposed ends thereof forming a fuel inlet and fuel outlet, the chamber having a heat conductive central core generally axially aligned in the chamber, a thermal heating element mounted in the core, and a plurality of radially extending fuel passages axially located in the chamber, the passages being separated by spaced apart fins radially extending outwardly from said core and in contact with said core, whereby fuel passing through said passages from said inlet to said outlet may be subjected to a temperature increase in response to temperature sensing means monitoring the temperature of said fuel being treated by said device.

In greater detail, the device of the present invention preferably comprises a suitable housing of metal or other like material and which is preferably of a generally cylindrical nature of an elongated configuration. The particular material from which the housing is made of is not critical but it must be capable of withstanding the operating environment as well as being fuel-resistant. Thus, for example, various metal materials or synthetic materials may be employed for this purpose. Typically, the housing may be of an extruded cylindrical shape of aluminum, steel or the like.

The housing defines a substantially enclosed chamber with a pair of end portions, each of which is provided with an outlet or inlet, as the case may be, to provide a fuel inlet and a fuel outlet for the device. Such inlet and outlet will be substantially the same in diameter or cross sectional area to the normal fuel line between a fuel pump and a carburetor.

The heat conductive central core extends axially of the chamber and is preferably centrally, or substantially centrally located thereof. Such a core is designed to provide the requisite heat requirements for elevating the temperature of fuel being treated by the device of the present invention and to this end, the heat conductive core may be of any suitable material with suitable insulation surrounding the core. Heat conductive cores are generally known and such cores as will be appropriate may be employed in the device of the present invention.

The device of the present invention also includes a substantially solid central body surrounding the heat conductive core and in heat transmittal relationship thereto. Most desirably, the central body is in direct or face-to-face contact with the heat conductive core for maximum efficiency. The core is provided with a plurality of radially extending fins connected to the core at least in heat conductive relationship thereto and which preferably terminates substantially in face-to-face relationship with the body or housing of the device. The fins are mounted in spaced apart relationship relative to each other so as to provide a plurality of passages extending between adjacent fins, the length of the body or housing from the fuel inlet to the fuel outlet. The fins are preferably relatively thick compared to the width of the passageways so as to provide a relatively large surface area over which the fuel can flow. Thus, fuel injected into the device of the present invention flows through these passages defined by the spaced apart fins through to the outlet portion or member of the device.

The total area of the passages is preferably not less than the total cross sectional area of the fuel inlet so as not to restrict the flow of fuel from the fuel pump to the carburetor. Preferably, at least substantially the same area is provided for the fuel to flow through the device of the present invention as the cross sectional area of the fuel inlet, or even more preferably, a slightly increased area.

By virtue of the heat conductive element, the fuel may be heated to a desired temperature as determined by the capacity of the heating element and the surface of the fins over which the fuel passes from the inlet to the outlet. To this end, preferably passages between adjacent fins are of a relatively nominal cross sectional area—most desirably, a plurality of such fins with a corresponding plurality of passages are provided so as to obtain a maximum heating effect for the fuel as it passes between the inlet and the outlet. The specific number of passages included in a device of the present invention will vary depending on the volume of fuel to be treated by the device of the present invention. Typically, for an automobile vehicle, such passages will vary from 3 or 4 to 20 or more, each being of, e.g. 1/16th to $\frac{1}{4}$ inch or more in width and with a depth of $\frac{1}{4}$ to $\frac{3}{4}$ inch or more.

The device of the present invention may be mounted in any appropriate position relative to an internal combustion engine, being located between a fuel pump and a metering device such as a carburetor. Suitable conduits will connect the device of the present invention to the fuel pump at the inlet end and at the outlet end, to a carburetor. In this manner, the fuel being metered to an internal combustion engine by the carburetor may be pre-heated to a desired temperature for optimization of the fuel combustion by the internal combustion engine.

The device of the present invention includes circuitry, as described hereinafter, for monitoring the temperature of the fuel being passed through the chamber, and between the fins, and further, a suitable source of electrical current, as supplied by e.g. an automobile battery, is employed for providing the electrical current for the heating element and the circuitry.

Having thus generally described the invention, reference will now be made to the accompanying drawings illustrating preferred embodiments, and in which.

Figure 1:
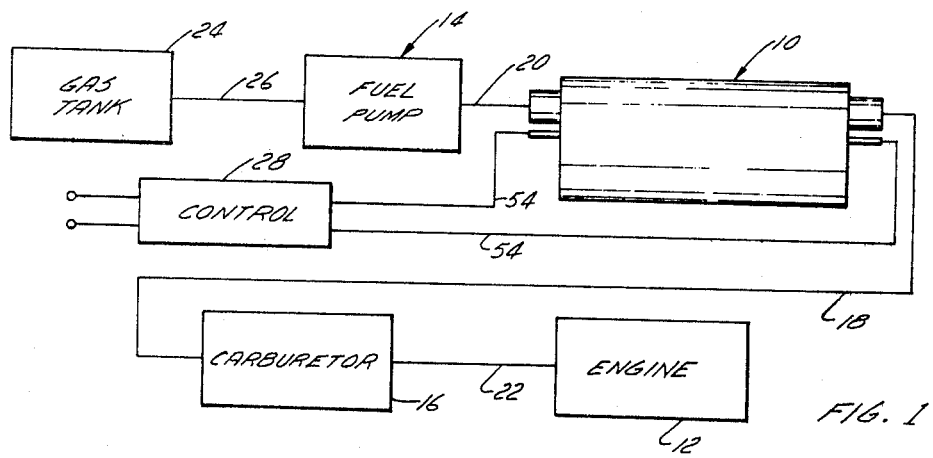
FIG. 1 is a schematic diagram showing the device of the present invention in combination with an internal combustion engine and its relative location thereto.

Referring now in greater detail to the drawings, FIG. 1 is a diagrammatic illustration showing the device of the present invention indicated generally by reference numeral 10 as such device would be used in an internal combustion engine indicated by reference numeral 12.

In use, in such a case, the device is located between a conventional fuel pump 14 and a carburetor 16. A fuel conduit 18 connects the device 10 with the carburetor 16 and likewise, a fuel conduit 20 connects the fuel pump to the inlet portion (described hereinafter) of the device 10. From the carburetor, a further fuel line 22 connects the carburetor in operative relationship to the engine 12. A supply of gas as from a gas tank 24 is provided for supplying fuel through a conduit 26 to the fuel pump 14. Control means 28 for the device of the present invention are provided, as will be described hereinafter in greater detail.

Figure 2:
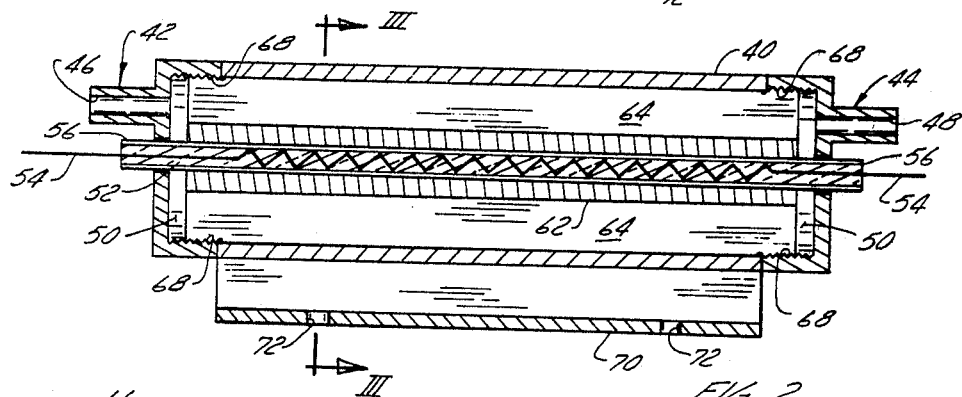
FIG. 2 is a longitudinal section taken through the device of the present invention.
Figures 3, 4:
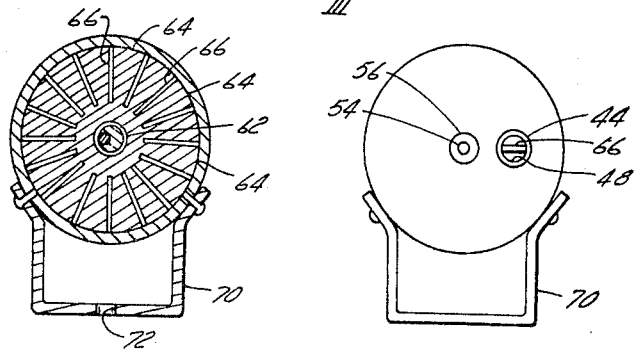
FIG. 3 is a section taken along the line III—III of FIG. 2.
FIG. 4 is an end view of the device of the present invention.

In the device of the present invention, illustrated in greater detail in FIGS. 2 through 4, the device includes a generally elongated cylindrical housing 40 with an inlet portion indicated generally by reference numeral 42 and an outlet portion indicated generally by reference numeral 44. Inlet portion 42 comprises a threaded "cap" for the body 40; in a like manner, member 44 is threadably connected as will be described hereinafter in greater detail, and forms a "cap". Both the inlet and outlet portions include conduits 46 and 48 respectively defining a fuel inlet conduit and a fuel outlet conduit. The caps 42 and 44 form a fluid-tight connection with the outer body or shell 40.

Located interiorly of the outer housing or shell 40 is a chamber enclosed by the housing 40 and caps 42 and 44, which chamber is indicated by reference numeral 50. Chamber 50 includes a heat conductive central core 52 extending axially of the chamber. Member 52 may comprise any suitable heating element 54 embedded in, for example, suitable ceramic or the like material 56. Heating element 54 is connected to the control unit 28 as described hereinafter. A sheath of aluminum or other like heat conductive material 56 may be provided about the heating element.

A finned body 60 is located within the chamber 50 and in contact with the metal sheath 56 of the heating element and the finned body comprises a heat conductive generally cylindrical member with a solid central portion 62 having fins 64 connected thereto and projecting therefrom. Adjacent fins 64 are, as illustrated in FIG. 3, spaced apart from each other to allow a passageway 66 with the area of the passageways, in total, providing a fuel flow passageway generally equal to the cross sectional area of the fuel inlet whereby a substantially unimpeded fuel flow, in terms of volume, may be passed through the device 10 of the present invention, to the carburetor.

The passageways 66 provide a relatively large surface area for the fuel to contact. In other words, fuel entering the device 10 of the present invention through fuel inlet 46 is split into a plurality of streams passing through the passageways 66 and which will provide a relatively large contact area for the fuel with the fins 64 as the fuel passes from the inlet 46 to the outlet 48. The fins, as will be seen from FIG. 3, are in heat conductive relationship with the solid central portion 62 of the body within the chamber 40, and which in turn, is in contact with the metal sheath 56 of the heating element.

In a preferred arrangement, the fuel on entering through the inlet 46 passes into a relatively small chamber between the end cap 42 to permit the fuel to equalize and pass through the passageways 66; in a like manner, at the outlet end, a small chamber between the body is provided to permit the fuel from the passageways 66 to form a stream on exiting through the discharge outlet 48.

In the embodiment shown, the body enclosed within the chamber 40 is provided with a threaded end portion 68 onto which the respective caps are threaded. The device is constructed so that there is a relatively tight fit between the housing 40 and the body enclosed within the housing so that substantially all of the fuel being treated with the device of the present invention passes through the passageways 66.

A mounting bracket 70 may be fixedly secured to the housing by suitable means, and which may be fastened by means of bolts, screws or the like to a suitable frame member through apertures 72 for mounting on an engine.

Figure 5:
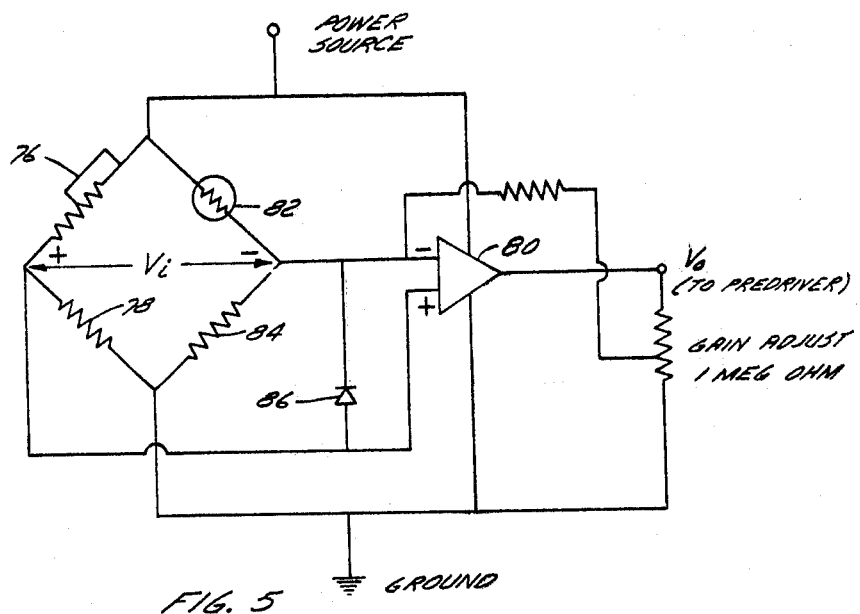
FIG. 5 is a schematic diagram of a control circuit for use with the device of the present invention.

Referring now to FIGS. 5 through 8, and initially to FIG. 5, the control circuit of the present invention is illustrated, provided with a variable gain adjustment. The control circuit includes a variable resistance 76 and a fixed resistor 78 which together constitute a voltage divider providing a reference voltage with which a control signal is compared. This reference signal is connected to a non-inverting input of an operational amplifier 80.

A thermistor 82 is connected in a similar manner to a further resistor 84 to provide an inverting signal input. Thus, as the temperature of the thermistor 82 increases, its effective resistance drops. In turn, this causes a potential at the inverting input to appear positive with respect to the non-inverting input and hence driving the output of the operational amplifier 80 to 0. An opposite effect takes place on cooling the thermistor 82 below its set point and in such a case, its effective resistance is therefore high, whereby the potential at the inverting input appears negative with respect to the non-inverting or reference input.

In operation in an ON-OFF mode with no feedback, the extremely high gain of the operational amplifier 80 forces its input into saturation even for extremely small voltage differences at the input driving the power amplifier 80. In turn, this causes current to flow through the heater raising the temperature of the thermistor driving the potential at which the inverting input up to that of the non-inverting input, at which point the heater shuts off. The magnitude of the reference voltage is varied by resistor 76 to provide a variable temperature set-point.

A diode is connected between the inverting and the non-inverting inputs, as indicated by reference numeral 86, to protect the amplifier from any voltage transients which might appear across the terminals. In normal operation, the highest voltage which would be expected for a typical application for an internal combustion engine, across the inputs, is in the order of 0.2 volts. For any positive-negative junction diode, the minimum break-over voltage is of the order of 0.7 volts and hence the diode 86 will not conduct unless the voltage across it exceeds such a value.

In the optional embodiment of the control circuit where a variable gain mode is provided for, a feedback network may be incorporated into the design as illustrated in FIG. 5. Such a feedback network will allow the heater to run at full output up to a given temperature during which period, the output of the operational amplifier is forced into saturation. As the temperature of the thermistor 76 approaches within a given number of degrees beneath the desired temperature, the output voltage of the operational amplifier falls off in a predetermined rate (by the feedback network) in a linear fashion. This droop, representing the number of degrees beneath the set-point temperature at which the control mode switch is to be proportional, may be adjusted to a very minor value—e.g., in the order of 0.25° C., yielding the maximum temperature air which is possible. Frequency composation is provided by an internal asset of the operational amplifier, which assures system stability under variable conditions.

The output will continue to fall off until the power amplifier approaches the cut-off region, at which point a 0 output is achieved. Thus, for any given load between minimum and maximum values, the temperature may be maintained within 0.25° C.

Figure 7:
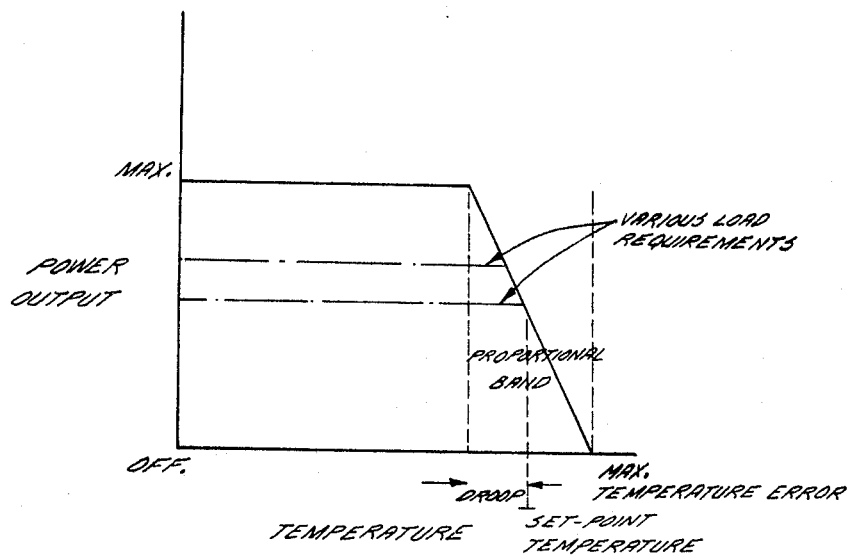
FIG. 7 is a schematic graph showing the power output versus temperature relationship.

It should be noted that with reference to the above description, this applies to steady-state conditions encountered after a transient phase during which the response may fluctuate around a given set-point. This is illustrated in FIG. 7 showing the power output relative to the temperature factors.

The type of amplifier 80 that may be employed in this invention may be any suitable amplifier, provided it functions to apply a voltage across the heter 54 in direct proportion to the magnitude of the voltage output of the control comparator. A typical amplifier which may be employed is the Texas Instruments operational amplifier designated as "uA 741".

The amplifier can function either as a power switch to thereby reduce heat dissipation by limiting collector-emitter voltages to their saturation values, or as a proportional amplifier in which effective heat sinks may be incorporated into the design.

Figure 6:
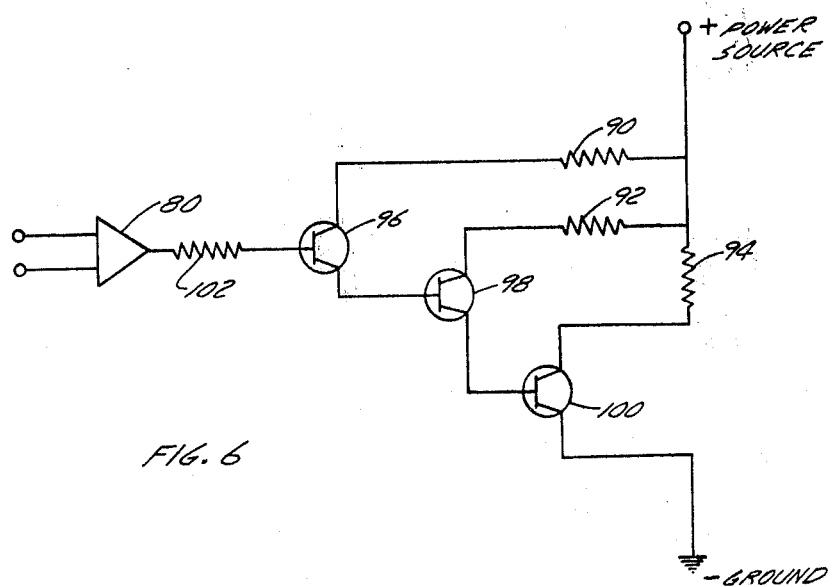
FIG. 6 is a schematic diagram of a power amplifier and predriver circuitry.

In operation of the control circuit including the power amplifier, as further illustrated in FIG. 6, resistors 90 and 92 and 94 function as collector lodes for transistors 96, 98 and 100. These transistors are connected to a common collector configuration as illustrated in FIG. 6, known as a "darlington" connection. The voltage output from amplifier 80 drives the base of transistor 96 through a resistor 102, allowing current flow into the base of the transistor 98. The emitter current from the transistor 98 is in turn applied to the base of transistor 100, permitting current to pass through the resistor 94 (functioning as a heating resistance). Switching operation may be accomplished by applying a differential voltage across the inputs to the operational amplifier 80 to effectively drive the power amplifier from a cut-off to saturation point.

Figure 8:
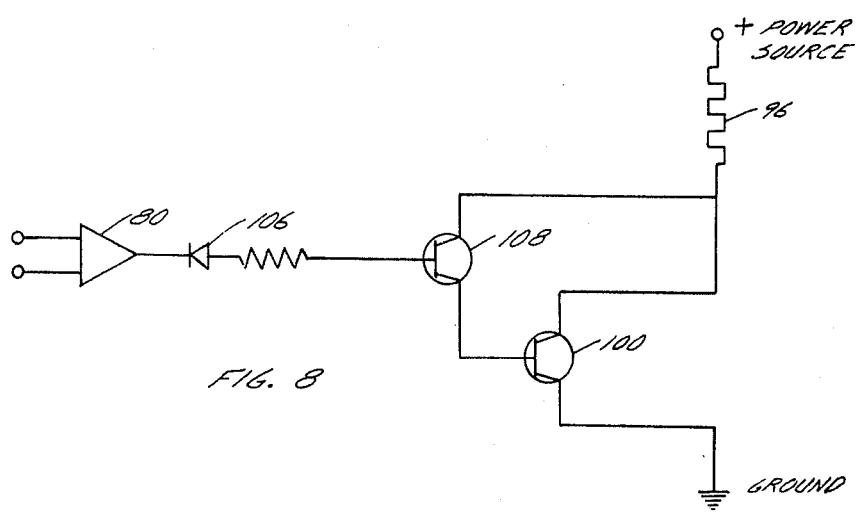
FIG. 8 is a schematic diagram illustrating an alternative embodiment to that of FIG. 6.

An alternative arrangement is illustrated in FIG. 8 in which similar reference numerals designate similar components to those previously described. In this case, the operation of the arrangement shown in FIG. 8 is similar to that shown in FIG. 6 but the circuit includes a zener diode 106. In this circuit, compared to that of FIG. 6, transistor 98 is eliminated as well as the collective resistance by incorporation of a darlington device 108. Heat dissipation is transferred to the darlington device 108, which is mounted on a metallic heat sink (not shown) which may, for example, be the metallic housing of the device of the present invention. By utilizing the metallic housing, the heating resistance allows for both effective heat dissipation and utilization of dissipated heat in flow heating.

In the above-described drawings, a suitable power source is utilized as indicated by the "+" and "−" sources shown. Such electrical current may be provided by for example a 12-volt automobile battery or alternatively a separate power source.

The embodiments of the invention in which an exclusive property or privilege is claimed are defined as follows:

1. A fuel temperature controlling device for use in an internal combustion engine in which fuel is metered to the engine, the device having an elongate tubular casing closed at each end, a fuel inlet at one end of the casing, a fuel outlet at the other end of the casing, electrically heating means extending axially through the casing, an impervious heat conducting tubular member extending over a substantial portion of the length of the casing, the member filling the space between the heating means and the casing and being in tight contact with both the casing and the heating means, each end of the member spaced a short distance from the respective end of the casing to form a chamber, a plurality of slots in the heat conducting member extending the length of the member between its ends, each slot extending radially inwardly from the outer surface of the member toward, but terminating short of, the heating means, each slot having a rectangular cross-sectional shape.

2. A device as defined in claim 1, including fuel temperature sensing means and electrical means operated by these sensing means to control the operation of the heating means.

3. A device as defined in claim 1, wherein the casing and the member are cylindrical in shape.

4. A device as defined in claim 3, wherein the slots are equally spaced about the heat conducting member.

5. A device as defined in claim 1, wherein the total cross sectional area of the sots is at least equal to or greater than the cross sectional area of the fuel inlet.

* * * * *

UNITED STATES PATENT AND TRADEMARK OFFICE
CERTIFICATE OF CORRECTION

PATENT NO. : 4,259,937

DATED : April 7, 1981

INVENTOR(S) : Kevin J. Elliott

It is certified that error appears in the above—identified patent and that said Letters Patent is hereby corrected as shown below:

On the cover sheet Insert:

-- (30) Foreign Application Priority Data

July 18, 1978     Canada     295214 ---.

Signed and Sealed this

Twenty-first Day of July 1981

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,259,937
DATED : April 7, 1981
INVENTOR(S) : Kevin J. Elliott

It is certified that error appears in the above—identified patent and that said Letters Patent is hereby corrected as shown below:

On the cover sheet Insert:

-- (30) Foreign Application Priority Data
January 18, 1978    Canada    295214

This certificate supersedes Certificate of Correction issued July 21, 1981.

Signed and Sealed this

Third Day of November 1981

[SEAL]

Attest:

GERALD J. MOSSINGHOFF

Attesting Officer    Commissioner of Patents and Trademarks